J. H. WAGENHORST.
VEHICLE WHEEL RIM.
APPLICATION FILED JUNE 10, 1912.
1,177,460.
Patented Mar. 28, 1916
2 SHEETS—SHEET 2.
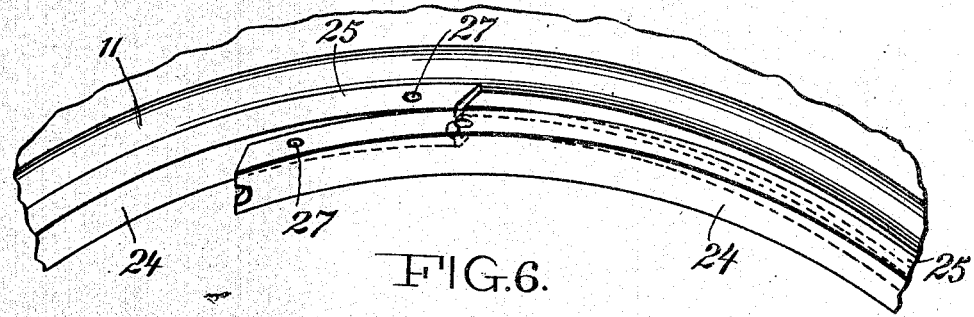
FIG. 5.
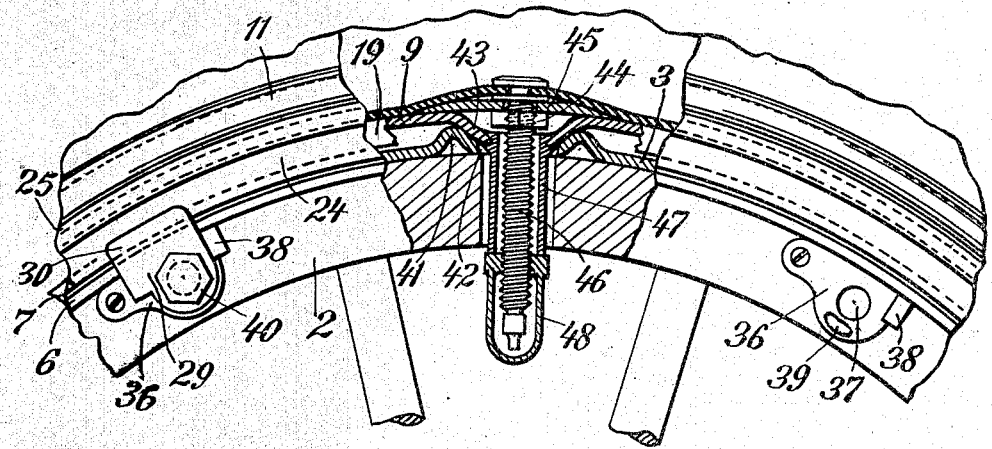
FIG. 6.
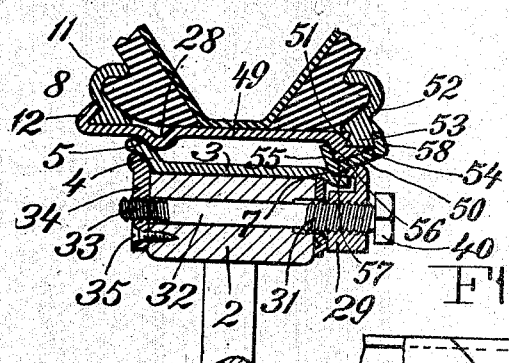
FIG. 7.
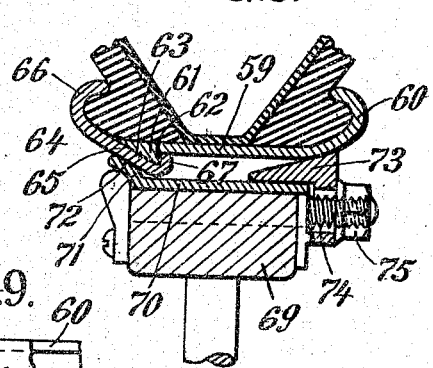
FIG. 8.
FIG. 9.
Witnesses:
Gerald E. Terwilliger
Edmund Quincy Moses
Inventor
James H. Wagenhorst
By his Attorney
Edward Davis

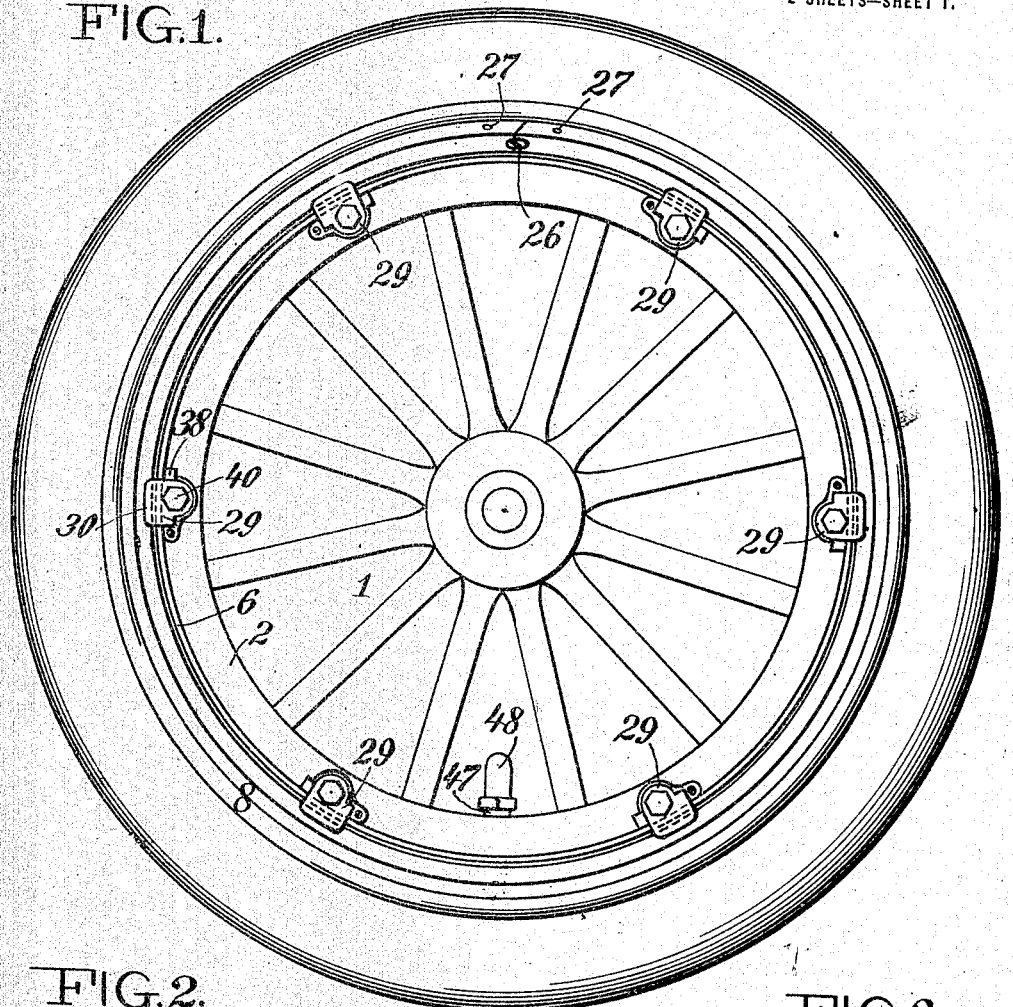
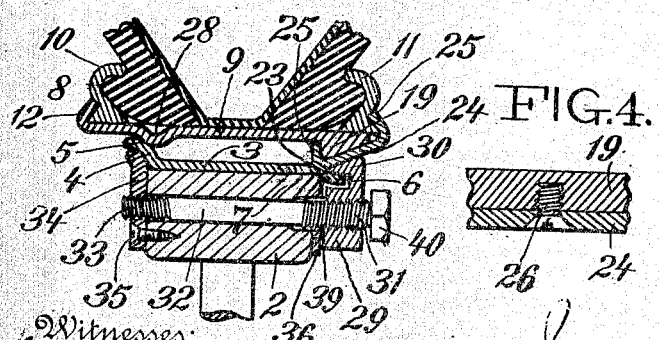
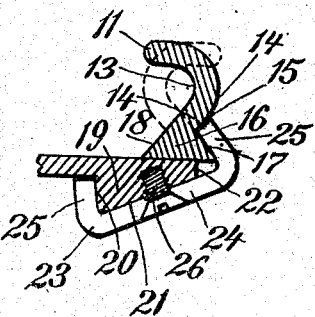

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE-WHEEL RIM.

1,177,460.   Specification of Letters Patent.   Patented Mar. 28, 1916.

Application filed June 10, 1912. Serial No. 702,855.

*To all whom it may concern:*

Be it known that I, JAMES H. WAGENHORST, a citizen of the United States, residing in the city of Akron, county of Summit, and State of Ohio, have invented certain new and useful Improvements in Vehicle-Wheel Rims, of which the following is a specification.

This invention relates to improvements in vehicle wheel rims in which the tire-carrying rim is demountable from the wheel and in which one of the tire-retaining flanges of the rim may be taken off so as to facilitate the application and removal of the tire.

My invention contemplates an improved construction for securing the removable flange to the rim, and also comprises certain improvements in the means for securing the tire-carrying rim upon the wheel.

In the accompanying drawings which form a part of this specification, Figure 1 is a side elevation of a vehicle wheel having one embodiment of my improved rim applied thereto; Fig. 2 is a transverse section through the wheel felly, felly band, tire-carrying rim and base of the tire; Fig. 3 is a transverse section on an enlarged scale through a portion of the rim base and removable tire-retaining flange, one end of the locking ring appearing in elevation; Fig. 4 is a longitudinal section through a fragment of the rim base and locking ring showing the attaching screw for locking the ends of the locking ring against displacement; Fig. 5 is a side elevation of a portion of the tire, rim base, removable tire-retaining flange and locking ring showing the ends of the locking ring telescoped preparatory to its removal; Fig. 6 is a side elevation of a portion of the wheel felly and rim shown in Fig. 1, a part of the felly, felly band, rim base and tire being broken away to illustrate the construction at the valve-stem, the dust cap and tube being shown in section and one of the clamps being removed to show the plate or washer secured to the side of the felly; Fig. 7 is a view similar to Fig. 2 illustrating a modification of my device; Fig. 8 is a similar view of another modification; Fig. 9 is a side elevation of a portion of the rim shown in Fig. 8 removed from the wheel.

Referring to the drawings in detail, the numeral 1 designates a vehicle wheel having a felly 2, which, if of wood, is preferably provided with a metallic felly band 3. At one side the felly band is provided with a raised flange 4, the outer curved surface of which, 5, forms a bearing surface upon which rests one side of the tire-carrying rim. At the other side the felly band is preferably bent down slightly, as indicated at 6, to form a bearing surface 7 adapted to be engaged by the tire-carrying rim. The edge 6 of the felly band may project slightly beyond the side of the felly, as shown. It will thus be seen that the periphery of the wheel is provided near its edges with bearing surfaces of different diameters.

8 is the tire-carrying rim which comprises the rim base 9 and the endless reversible tire-retaining flanges 10 and 11. The flange 10 is applied to the rim base before the tire is applied, it being held upon the rim base by the inwardly hooked flange 12 thereof. The flange 10 normally remains upon the rim base, being removed only when it is desired to reverse the same to receive a different kind of a tire. The flange 11, on the other hand, is secured to the rim base in such a manner that it may easily be removed, so as to permit a tire having inextensible selvages to be applied to or removed from the rim. In the form of my invention shown in Figs. 1 to 6, the flange 11 comprises an endless ring having a clencher groove 13 in one face thereof, the other face of the ring being formed for engagement with a straight-sided tire. For this purpose such face is provided with a convex bearing surface 14 which engages the side of the tire. Below this bearing surface is a groove 15 which separates the bearing surface from the base 16 of the ring. This base is substantially dovetail-shaped, having an inclined wall 17 below the groove 15 corresponding in inclination to the wall 18 at the bottom of the clencher groove 13. This form of ring is claimed broadly in my application Serial Number 639,953, filed July 22, 1911, and is therefore claimed in the present application only in combination with other elements. It will be understood that my present invention is not limited to this specific form of tire-retaining flange, but that the form of the flange may be varied in numerous ways. The flange 11 seats upon the edge of the tire-seating surface of the rim base 9 in the form of my invention now being described, the portion of the rim base upon which the ring seats having formed on its under-side an inwardly projecting annular rib or flange 19. The inner wall 20 of the rib 19 is preferably substantially vertical, while the lower wall 21 thereof tapers outward toward the edge of the tire-seating surface of the rim so that the rib is of substantially triangular section. The rim base preferably is not carried out to a sharp edge, but is blunt, as indicated at 22. For securing the flange 11 upon the rim base, I use a transversely split U-shaped locking ring 23, the web 24 of which lies parallel to the inclined surface 21 of the rib 19, while the legs 25 of the channel engage the surface 20 of the rib 19 and the surface 17 of the flange 11, respectively. These legs of the channel may be parallel, but preferably are inwardly hooked, as shown, so that the inner walls of the channel legs converge or are undercut. The rib 19 and base of the flange 11 fit in the channel like a dovetail, thus holding the locking ring in position. The inward hooking of the legs of the channel also decreases the tendency of the legs to bend out and permit the locking ring to slide from its seat. The web 24 of the channel being inclined in the general direction indicated, lies substantially in the line of stress due to the lateral pressure of the base of the tire upon the endless locking ring, and thus acts in the most efficient manner in retaining the ring. The leg of the channel engaging the surface 17 of the locking ring being inwardly inclined at a sharp angle instead of being parallel to the plane of the wheel, as the walls of the channeled locking rings have heretofore been constructed, adds its strength to that of the flange and reinforces the latter to such an extent that the weight thereof may be substantially reduced. It overcomes the tendency which the locking ring has to roll or tip over the edge of the channel. It will be seen that the forcing out of the tire-retaining flange against the wall of the locking ring holds the same in position, owing to the inclination of the engaging surfaces. The locking ring may also be made of spring metal and given a tendency to expand in diameter beyond that of its seat, so that it will be held in position by its own resilience. Additional means may, however, be provided, if desired, to hold the locking ring in position; for example, a screw 26 may be inserted through a hole formed at the place where the locking ring is transversely split, the screw entering a threaded socket in the rib 19. The locking ring is preferably diagonally split as shown in Figs. 1 and 5. The dovetail engagement of the locking ring with the rib 19 and base of the flange 11 does not prevent its removal, as this may readily be accomplished when the tire is deflated by sliding the flange 11 laterally far enough to disengage the leg 25 of the locking ring. The locking ring is made of sufficient width to permit the inner wall of the outer leg 25 to clear the blunt edge 22 of the rim base, so that when the flange 11 is moved laterally the locking ring is free to be taken off. To remove the locking ring its ends are telescoped and the ring contracted, as indicated in Fig. 5. The ends of the ring may be provided with sockets 27 for the reception of a tool to aid in the collapsing of the ring, if it is found necessary.

The tire-carrying rim above described may be secured on a wheel either permanently or detachably by any appropriate means. It is preferably, however, removably mounted upon the wheel provided with the felly band having bearing surfaces of different diameters, as shown in Fig. 2. In the latter case, the rim base preferably has a rib 28 rolled therein and shaped to engage the bearing surface 5 of the flange 4 of the felly band. At the other side of the wheel the lower corner of the locking ring 23 engages the bearing surface 7. The thickness of metal necessarily formed by the rib 19 and the locking ring is thus utilized to form an inwardly extending annular projection, providing a bearing surface on the rim of reduced diameter adapted to engage the bearing surface of less diameter of the felly band. The engagement of the locking ring with the felly band also clamps the former positively in position and prevents any possibility of this ring becoming loose. The tire-carrying rim may be secured upon the wheel by any suitable means; for example, by means of the clamps 29 having the wedge portions 30 which ride on the extended edge 6 of the felly band 3 and wedge between the bearing surface 7 and the under-surface of the locking ring 23. The clamps 29 have internally threaded openings therethrough which screw upon threaded portions 31 of bolts 32 which extend transversely through the felly. The bolts 32 have screw-threaded end portions 33, the threads of which are of opposite pitch to the threads of the portions 31 of the bolts. The threaded portions 33 screw through nuts 34 fixed to the back of the felly in any suitable manner, as by means of screws 35. The front of the felly preferably has plates 36 fixed thereto having openings 37 through which the bolts pass, the plates having outwardly projecting lugs 38 which limit the rotary movement of the clamps 29. The plates are also preferably provided below the openings 37 with small bosses 39 pressed up from the metal of the plates, these bosses being engaged by the clamps when the latter are forced in, thus tending to tip the wedge portions of the clamps toward the wheel and overcoming the tendency of the clamps when screwed up to be drawn up at the bottom closer than at the top and thus bend the ends of the bolts. The operation of the clamps and bolts is similar to that of the clamps described and claimed broadly in my application Serial Number 589,680, filed October 29, 1910, only in the present case the bolts passing through the felly rotate and the internally and externally threaded sleeve or nut described in my former application becomes unnecessary. The rotation of the bolt 32 in the proper direction by means of a wrench applied to its head 40, supposing the wedge to be screwed up as shown in Fig. 2, will cause the screw-threaded portion 33 of the bolt to unscrew from the nut 34, and will also cause the clamp 29 to travel along the oppositely threaded portion 31 of the bolt toward the head of the nut. When the wedge portion 30 has cleared the edge of the felly band, the clamp will automatically rotate with the bolt through a half revolution, it being stopped in inverted position by the engagement of a shoulder formed thereon with the lug 38. The rim is then free to be removed. After the rim has been replaced it is clamped in position by rotating the bolt 32 in the opposite direction, which will first carry the clamp into erect position, and thus cause the clamp to travel along the threaded portion 31 of the bolt, while the bolt itself screws into the nut 34. The combined action of the two oppositely threaded portions of the bolt thus produces a quick flight of the clamp and rapidly draws the clamp into tight wedging engagement with the parts.

In Fig. 6 I have shown a novel construction for preventing creeping of the rim. For this purpose the felly band has an annular ridge 41 pressed up therefrom, this ridge being preferably formed around the opening 42 for the valve-stem. The rim has a boss 43 pressed therefrom adapted to fit within the ridge 41. These projections on the felly band and rim may be formed very cheaply and accurately by pressing the metal between dies, and when so formed a corresponding shaping of the parts is secured which causes them to fit with considerable accuracy over a substantial area. Great durability is thus obtained and the projections being integral with the rim and felly band, there is no danger of their working loose or coming off, as is the case with riveted-on driving plates. The depression formed in the tire-seating surface of the rim in making the boss 43 also serves to guide the valve-stem 46 into its opening when the tire is being applied to the rim and may be used to receive the nut 44 which secures the clip 45 to the valve-stem. A short tube or sleeve 47 may project inwardly from the boss 43, this tube serving as a guard for the valve-stem. The dust-cap 48 incloses the end of the valve-stem and screws tightly against the end of the sleeve or tube 47, thus preventing the access of dust and moisture thereinto. The hole through the felly through which the valve-stem passes is preferably made of sufficient diameter to permit the tube and dust-cap to pass freely therethrough, so that the rim may be placed upon or removed from the wheel with the dust-cap in position.

In Fig. 7 I have shown a modification of my invention in which the rim base 49 has an annular depression formed at one edge thereof. The bottom of this depression forms a seat 50, while the side wall 51 of the depression is preferably undercut. The removable tire-retaining flange 52 has a dovetail-shaped base 53 adapted to be received in this depression in the rim base. A channeled locking ring 54 is used to secure the removable tire-retaining flange in position. One leg 55 of this channeled ring engages the wall 56 of the rib 57 projecting inwardly from the under-surface of the rim base. The other wall 58 of the channeled locking ring engages the outer wall of the dovetail-shaped base 53 of the tire-retaining flange 52. In this form of my invention the legs 55 and 58 of the channeled locking ring are made parallel, so as to permit the locking ring to be applied and removed, the tire-retaining flange not being capable of lateral movement as in the form of my invention described above. The tire-carrying rim shown in this figure may be removably mounted upon a wheel in the same manner as the form of rim described above. It is to be understood, however, that either of these forms of rims may be secured upon a wheel by the use of any suitable means other than those shown and described. The construction of the removable tire-retaining flange and the means for securing the same in position, as shown in Fig. 7, is a very useful one, and the tire-retaining flange is locked very solidly in position. The lateral stress upon the flange caused by the pressure of the air in the tire is the most serious one to which the flange is subjected. This stress is applied to the flange at a point considerably above the base thereof and has a tendency, therefore, to tip the flange over and roll it out of its seat and over the retaining leg 58 of the channeled locking ring 54. With the dovetail-shaped base 53, any tendency of the tire-retaining flange to lift or roll out of its seat acts to wedge the base tightly between the converging walls of the depression in the rim base and the channel leg 58. Also, the wall of the dovetail-shaped base 53 interlocks beneath the undercut wall 51 of the depression in the rim base, which thus positively holds the base of the retaining flange from lifting out of its seat. The tire-retaining flange shown in Fig. 7 is reversible, as is the case in the other form of my invention described.

Figs. 8 and 9 show a modified form of rim embodying certain features of my invention. In the structure shown in these figures, the rim comprises an endless ring 59 having one tire-retaining flange 60 formed integral therewith, and having near the edge opposite to the flange 60 an inwardly projecting rib 61. The side wall 62 of this rib is preferably substantially vertical, while the bottom wall 63 thereof tapers outwardly toward the edge of the ring. The second part of the rim consists of a transversely split ring 64 which comprises the inclined portion 65 lying parallel with the inclined surface 63 of the rib 61, and the tire-retaining flange 66. The inner edge of the portion 65 of the ring is turned up to form a flange 67 engaging the wall 62 of the rib 61. The ring 64 is preferably split diagonally as indicated at 68 in Fig. 9. It will be seen that the stress put upon the flange 66 by the inflated tire will be transmitted substantially in the line of the inclined portion 65 of the split flange to the engaging surfaces of the rib 61 and flange 67. The disposition of the parts is thus the most efficient obtainable for resisting the stresses caused by the inflated tire. These stresses have no tendency to unhook the flange 67 from the rib 61. The tapered surface 63 at the side of the endless ring 59 also serves to facilitate the application of a split ring to the endless ring by guiding the flange 67 to its proper position. The rim shown in these figures is preferably removably mounted upon the wheel; for example, as shown in Fig. 8. For this purpose the felly 69 of the wheel, if of wood, is provided with a metallic felly band 70 which has a flange 71 at one edge thereof. This flange is preferably bent to provide an inclined bearing surface 72 adapted to engage the under-surface of the inclined part 65 of the split ring 64. Thus, when the rim is mounted upon the felly band, the ring 64 is effectually held in position by its engagement with the flange of the felly band. The rim may be held upon the felly band in any suitable manner; for example, wedges 73 may be inserted between the felly band and rim, the wedges being secured to the wheel by means of bolts 74 and nuts 75.

Having thus described certain preferred embodiments of my invention, but without desiring to limit myself thereto any further than as specified in certain of the more limited claims hereunto appended, I claim:

1. In a vehicle wheel rim, in combination, a rim base, a removable tire-retaining flange, and means for removably securing the flange to the rim base comprising a transversely split channeled locking ring, the inner walls of the legs of which are undercut, said legs engaging retaining means on said rim base and said removable flange, respectively, the web of said channel being inclined to the plane of said wheel and seating against a correspondingly inclined portion of the rim base.

2. In a vehicle wheel rim, in combination, a rim base having an annular rib projecting from the under-side thereof, the under-surface of said rib being formed into an annular seat inclined outwardly and away from the axis of the wheel, a tire-retaining flange removably mounted on said rim base, and means for retaining said tire-retaining flange upon said rim base comprising a transversely split channeled locking ring, the inner walls of the legs of said channel being undercut, one leg of said channel engaging said inwardly projecting rib, the other leg of said channel engaging the removable tire-retaining flange.

3. In a vehicle wheel rim, in combination, a rim base having an annular rib projecting inwardly from the underside thereof, a tire-retaining flange mounted on said rim base, and means for securing said tire-retaining flange upon said rim base comprising a transversely split channeled locking ring, one leg of said ring engaging the rib on said rim base, and the other leg of said channel being inclined to the tire-seating surface of the rim base and overhanging a portion of said tire-retaining flange, the web of the channel being inclined to the plane of the wheel in the direction of the force impressed upon the flange by the tire.

4. In a vehicle wheel rim, in combination, a rim base having an annular rib projecting inwardly from the under-side thereof, a tire-retaining flange carried by said rim base having a dovetail-shaped base portion, and means for securing said tire-retaining flange to said rim base comprising a transversely split channeled locking ring having one leg engaging the rib on said rim base, the other leg of said locking ring engaging and overhanging one wall of the base portion of said tire-retaining flange, the web of the channel being inclined to the plane of the wheel in the direction of the force impressed upon the flange by the tire and seating against a correspondingly inclined portion of the rim base.

5. In a vehicle wheel rim, in combination, a rim base having an annular rib projecting inwardly from the underside thereof, a removable tire-retaining flange mounted on said rim base, and means for securing said removable flange to said rim base comprising a transversely split channeled locking ring, the legs of said ring being inwardly hooked or convergent, one of said legs engaging the inwardly projecting rib, the other of said legs engaging and overhanging a portion of the removable tire-retaining flange, said tire-retaining flange being movable laterally on the rim base to free itself from the overhanging leg of the channeled locking ring so as to permit said channeled locking ring to be removed, the web of the channel being inclined to the plane of the wheel in the direction of the force impressed upon the flange by the tire and seating against a correspondingly inclined portion of the rim base, and detachable means located at the split in the ring for locking said ring against said seating surface.

6. In a vehicle wheel rim, in combination, a rim base having an annular rib projecting inwardly from the underside thereof, the bottom wall of said rib tapering outward toward the edge of the rim base, a removable tire-retaining flange mounted on said rim base, and means for securing said tire-retaining flange upon said rim base comprising a transversely split channeled locking ring, one leg of which engages said rib, the other leg engaging said tire-retaining flange and overhanging a portion of the same, the bottom of said channel seating against the bottom of said rib, the angle between the bottom of said channel and the leg of the same engaging said tire-retaining flange not exceeding a right angle.

7. In a vehicle wheel, a rim base, tire-retaining means mounted on one side of said rim base, an endless reversible tire-retaining flange mounted on the other side of said rim base and movable laterally thereof, said flange having a clencher groove in one face thereof, the other face of said flange being formed to engage a straight-sided tire, a groove being formed in said second face of the flange below the tire-engaging portion of the same, the lower wall of said groove being inclined in the opposite direction from the inclination of the lower part of the face of the flange having the clencher groove therein, said rim base also having an annular rib projecting from the under-side of said rim base near the edge of the same adjacent to said tire-retaining flange, the side wall of said rib being substantially vertical and the bottom wall of said rib tapering outward toward the edge of said rim base, said edge being blunt, and means for securing said tire-retaining flange upon said rim base comprising a transversely split channeled locking ring, the legs of which are inwardly hooked or convergent, one leg of said channel engaging the side wall of said rib, the bottom of said channel seating upon the inclined bottom of said rib, the outer leg of said channel engaging and overhanging an inclined wall of the base portion of said tire-retaining flange.

8. In a vehicle wheel, in combination, a rim base having a rib projecting from the under-side thereof, said rib having an inclined portion on the radially inner side thereof serving as a bearing surface, a tire-retaining flange removably mounted on said rim base, said flange being positioned adjacent the edge of the rim base and above said rib, and means for retaining said tire-retaining flange upon said rim base comprising a transversely split channeled locking ring, one leg of the channel of said ring engaging said rib, the other leg of said channel engaging the removable tire-retaining flange.

9. In a vehicle wheel, in combination, a rim base, a removable tire-retaining flange, and means for removably securing the flange to the rim base comprising a transversely split channeled locking ring, the legs of the channel of said locking ring engaging retaining members on said rim base and said removable flange respectively, the web of said channel being inclined to the plane of said wheel and seating against a correspondingly inclined portion of the rim base.

10. In a vehicle wheel rim, in combination, a tire-seating member having a plurality of inwardly projecting laterally spaced ridges, a removable tire-retaining flange mounted on said member, and means for retaining said flange on said member comprising a removable locking ring adapted to seat against one of said ridges, said ring having a flange projecting upwardly outside of the edge of said member, said flange engaging an overhanging portion of said tire-retaining flange.

11. In a vehicle wheel, in combination, a tire-seating member having a plurality of inwardly projecting laterally spaced ridges, a removable tire-retaining flange mounted on said member and capable of lateral movement with relation thereto, and a locking ring engaging one of said ridges and said ring flange, the engagement between said ring and said ridge retaining said ring against lateral movement, and the engagement between said ring and said flange preventing the removal of said ring until the flange has been moved laterally.

JAMES H. WAGENHORST.

Witnesses:
SEWARD DAVIS,
EDMUND QUINCY MOSES.